United States Patent

Brandt

[15] 3,699,995
[45] Oct. 24, 1972

[54] FUEL RESERVE DEVICE AND SYSTEM

[72] Inventor: Wilbur Brandt, 207 University Boulevard West, Silver Spring, Md. 20901

[22] Filed: Jan. 7, 1971

[21] Appl. No.: 104,612

[52] U.S. Cl. .............. 137/256, 137/588, 137/599.1
[51] Int. Cl. ............................................ B65d 25/00
[58] Field of Search...... 137/255, 256, 571, 572, 568, 137/599.1, 599.2, 588

[56] References Cited

UNITED STATES PATENTS

| | | | |
|---|---|---|---|
| 1,617,868 | 2/1927 | Skaggs | 137/588 X |
| 110,215 | 12/1870 | Dickinson | 137/599.2 X |
| 1,523,370 | 1/1925 | Skaggs | 137/205 |
| 2,557,438 | 6/1951 | Johnson | 137/256 |
| 2,737,199 | 3/1956 | Ingram | 137/599.1 |

FOREIGN PATENTS OR APPLICATIONS 1,226,866  6/1959  France.................137/568

*Primary Examiner*—Henry T. Klinksiek
*Assistant Examiner*—Robert J. Miller
*Attorney*—Smith, Michael, Bradford and Gardiner

[57] ABSTRACT

The device is an inexpensive, reliable and simply constructed fuel reserve system for internal combustion combustion engine powered devices, most generally motor vehicles; the device comprising a reservoir, a filling tube and a manually-operated valve for releasing the contents of the reservoir when the main fuel supply is exhausted.

6 Claims, 5 Drawing Figures

PATENTED OCT 24 1972　3,699,995
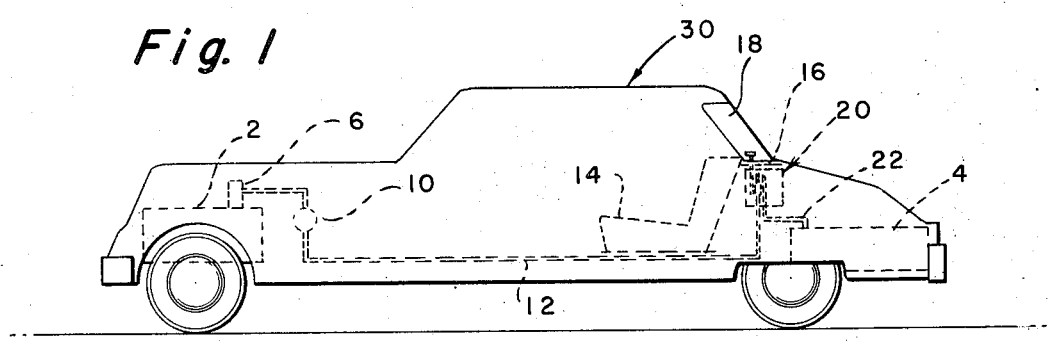
Fig. 1
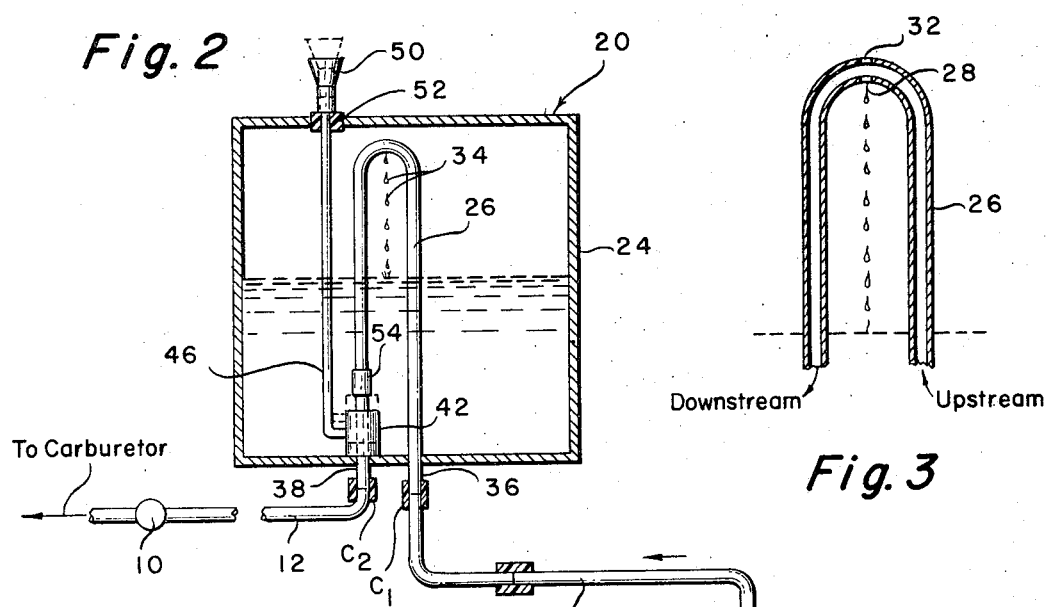
Fig. 2
Fig. 3
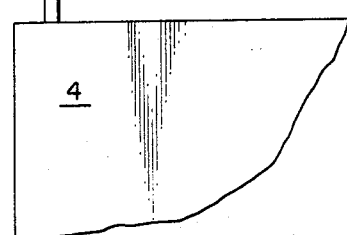
Fig. 4
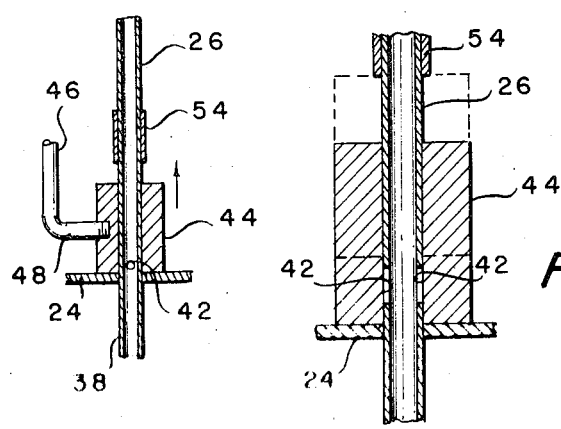
Fig. 5
INVENTOR.
Wilbur Brandt
BY
ATTORNEYS

FUEL RESERVE DEVICE AND SYSTEM

BACKGROUND

Various proposals have been advanced in the past to provide a limited fuel reserve for internal combustion engine powered apparatus including aircraft, automobiles, trucks, agricultural equipment, motorboats and the like. The need for such systems manifests itself particularly in road vehicles, because such vehicles are provided with very limited fuel reservoirs; a typical average for passenger automobiles being about 20 gallons. With the advent of high-speed expressways having long expanses where fuel supplies are unavailable, the limited fuel supply carried by the vehicle itself becomes insufficient to enable the operator to traverse the required distance between fuel stops or alternatively, to obtain maximum benefit from the use of such expressways because of the necessity of frequent fuel stops which drastically increase the lapsed time required to travel a given distance.

To further compound the situation, the average motor vehicle does not have a fuel gage calibrated with a great deal of accuracy with the result that the operator thereof can positively rely on the gage as a means for indicating remaining fuel supply, particularly, where the reserve is depleted to but a few remaining gallons.

Obviously, too, any stoppage of a vehicle in any situation other than when properly parked or stopped, creates a hazard for the operator, passengers, other operators of other vehicles and even those persons who may stop to assist the improperly halted vehicle. Also, aside from just plain embarrassment to the operator of an improperly stopped vehicle, many jurisdictions will and do specify that where the stoppage is due to an avoidable act, such as running out of fuel, the responsible party is subject to stiff penalties.

Some examples of the prior efforts to provide reserve fuel systems for motor vehicles in particular may be found in Bossi U.S. Pat. No. 1,643,539, Sperber et al. U.S. Pat. No. 3,301,310, Tunkhowser U.S. Pat. No. 2,734,561 and Skaggs U.S. Pat. No. 1,523,370. Despite the fact that the patented devices are known, aside from the "Volkswagen" manufactured in West Germany and sold in the United States during the last decade, few, if any, other vehicles are provided with a reserve or emergency system designed to provide a limited supply of reserve fuel for emergency situations. This situation is believed due primarily because the systems represented by the above noted patents are too complicated or expensive for application to the average mass produced vehicle since all require complex feed systems, extensive fuel tank modifications and/or utilize complex valves to make the reserve system operative.

THE INVENTION

This present invention, then, deals with a reserve fuel system and structure for internal engine powered vehicles which is simple in structure, reliable in operation and which can be cheaply manufactured and distributed to the public as an integral part of a newly-manufactured vehicle or readily installed in existing vehicles with relative ease. In fact, the device is particularly adapted for installation by "do-it-yourselfers" requiring virtually no vehicle modification or use of expensive tools.

It is, therefore, an object of the invention to provide a fuel reserve device of general utility for internal combustion engines.

It is an additional object of the invention to provide a simple reliable reserve fuel system for motor vehicles.

Another object of the invention is to provide an inexpensive, easily installed reserve fuel system and device for internal combustion engines having limited fuel supplies.

A further object of the invention is to provide a reserve fuel system and device readily installed in existing or newly-manufactured motor vehicles.

These and many other objects of the invention not specifically alluded to but inherent in the inventive concept and apparent to those skilled in the art, are accomplished by the device and system described in detail hereinafter, reference being made to the appended drawing wherein:

FIG. 1 is a side schematic view of a motor vehicle having the invention incorporated therein, FIG. 2 is a sectional view through a typical reservoir showing the details of the invention somewhat enlarged, FIG. 3 is a sectional view of a portion of a fuel line also enlarged over the showings of FIGS. 1 and 2, FIG. 4 is a view somewhat enlarged over FIG. 2 showing the reserve system operator valve, and finally, FIG. 5 is an additional and further enlarged view of a portion of the valve shown in FIG. 4.

Considering, now, FIG. 1, it will be seen that a typical passenger vehicle 30 is shown; said vehicle being powered by a conventional internal combustion engine 2. Fuel for the engine is supplied from a tank 4 to carburetor 6 via a fuel line 12 and conventional fuel pump 10. A fuel reserve device 20, comprising the invention is interposed in the fuel line between tank 4 and pump 10.

As is customary, tank 4 is located in the rear area of the vehicle under the trunk area of the vehicle. Thus, the reserve device 20 may be and, in fact, is disclosed as also being located in the rear of the vehicle at a location immediately behind rear seat 14 and directly below the customary "shelf" 16 between seat 14 and rear window 18.

The fuel line 12, as is also customary in the disclosed type of vehicle, runs from the vicinity of the tank 4 along the underside of the vehicle to the engine compartment area where it forms the inlet to fuel pump 10 the latter generally being an engine driven diaphragm pump. From pump 10 fuel is discharged into the float chamber of carburetor 6 which regulates combustion in engine 2, all as customary in the art.

In the usual system, fuel line 12 is directly connected to tank 4. In the disclosed system, however, fuel line 12 is connected to fuel reserve device 20 and this device is, in turn, connected by a line 22 to tank 4. The reserve device 20, reference now being made to FIG. 2, is comprised of a closed receptacle 24 of any desired shape but in this case shown simply as a cube-like tank. Internally of the tank there is fixed an inverted U-shaped tubular conduit 26 having small apertures 28, 32 disposed therein as is suggested by the drops 34 and shown in the enlarged portion of conduit 26 shown in FIG. 3. The terminal ends 36 and 38 of conduit 26 extend beyond the bottom wall of tank 24 and are connected, respectively, to fuel line 12 and to tank line 22 so that fuel drawn by pump 10 from the standard fuel tank 4 passes through conduit 26 before reaching pump 10.

In order to provide for selective communication of the interior of tank 24 with fuel line 12 the bight portion of the conduit includes the aforementioned apertures 28 and 32. Further, conduit 26 is also provided with a third aperture or apertures 42 in the vertical leg thereof defining the downstream side and terminus 38.

Surrounding the downstream leg of conduit 26 within reservoir 24 and adjacent terminal end 38, is a cylindrical collar 44 which collar is slidable along the conduit 26 and, for purposes to be described, is formed from a material having a density such as to preclude flotation in any fuel in tank 24 irrespective of the type of fuel, gasoline or diesel oil, as the case may be. The axial dimension of collar 44 is such that when collar 44 slides down the downstream leg of conduit 26 and its lower end abuts the bottom of tank 24, the body of the collar blocks the ports 42 to disrupt communication of tank 24 with conduit 26 at this point. On the other hand, when the collar 44 is slid upwardly along the downstream leg of conduit 26 it uncovers ports 42 to establish communication between conduit 26 and tank 24 via these parts. Collar 44 thus defines a slide valve and will be so designated hereinafter.

In order to effect sliding of valve 44 by manual operation externally of tank 24, a rod-like valve operator 46 is disposed closely adjacent and parallel to the downstream leg of conduit 26 and has one end, in this case an L-shaped extension 48 connected to slide valve 44 while its opposite end extends through and outwardly of the wall of tank 24 to be provided with a handle 50 adapted for manual manipulation.

While the details of the device have been described in terms of the drawings, it should be obvious that the disclosure relates to the simplest and most easily fabricated form of the device. Various changes in shape and techniques of fabrication of various components may be employed and as well the tank 24 may well be located in other areas of the vehicle than the trunk. For example, if the unit were an accessory unit to be installed in an existing vehicle, the terminal ends 36, 38 of conduit 26 might well be connected to tank line 22 and fuel line 12 via flexible connectors $C_1$ and $C_2$ of conventional form. Also, if the device 20 were installed on a truck, for example, the shape of tank 24 might be totally different to enable its location in or on a different area of the vehicle. In addition, valve operator 46 could take many forms and include a simple latch means to retain the slide valve in open position for a period of time as might be required. Any or all of such expedients are well within the skill of the art and within the spirit and scope of the concepts herein set forth.

OPERATION

In the typical and most simple arrangement described herein the reserve fuel device 20 operates automatically to assure that a reserve supply of fuel is available when needed. When the internal combustion engine is running and driving pump 10, fuel is drawn from main fuel tank 4 through line 22 via conduit 26 to the fuel pump 10 via fuel line 12. As the fuel reaches the bight portion of tubular conduit 26, a small portion thereof leaks from apertures 28 and 32 and gradually fills the receptacle 24. The apertures 28 and 32 must be large enough to permit leakage but are small enough to avoid any interruption of fuel feed to the regular pump 10. By careful calculation it is possible to co-relate the filling rate of the reserve tank 4 such that it will be completely filled by the time that an equivalent amount of fuel from the main fuel tank is used.

In the event the main fuel reservoir becomes depleted at an inconvenient place, the operator of the vehicle may simply pull up on handle 50 and ports 42 will be opened to place reservoir 24 in communication with the fuel line 12 and thus the vehicle can be driven for some additional period of time as may be necessary to replenish the fuel supply. After main tank 4 is filled, the valve 44 is permitted to close and the process of refilling the reservoir 24 is automatically initiated with the filling terminating when the fuel level again covers the bight portion of U-shaped conduit 26 and apertures 28 and 32.

As indicated, the most simple form of the invention is disclosed, hence in order to maintain valve 44 open, the operator 46 passes through a packing 52 of conventional form which engages operator with sufficient friction to hold the valve 44 open. Also, a stop means 54 may be provided on the downstream leg of conduit 26 to limit upward movement of slide valve 44 and, at the same time, enable the vehicle operator to sense that valve 44 is fully open.

Installation of the device is quite simple in a vehicle under construction. The position of the device 20 is established in accordance with space and design criteria and the fuel and tank lines installed accordingly. In an existing vehicle where the device is to be installed as an accessory, the usual fuel line 12 is cut and connected to end 38 of the conduit 26 by any suitable coupling means such as sleeve $C_2$. Similarly, the line 22 from main tank 4 is coupled to the end 36 of conduit 26 by any suitable coupling means such as sleeve $C_1$. The location of the device is one of convenience. However, it is preferable that it be located at a place where handle 50 is within easy reach and thus installation at the area illustrated is reasonably convenient.

Having thus described the invention in detail, what is claimed is:

1. A fuel reserve device for use between the main fuel supply and the fuel pump of an internal combustion engine or the like, comprising a closed reservoir, an inverted U-shaped tubular conduit in said reservoir, said conduit having apertures therein at the bight portion thereof adjacent the top of said reservoir and further apertures in one leg of the conduit adjacent the bottom of said reservoir respectively; a valve means cooperating with the apertures adjacent the bottom of the reservoir; and valve operator means extending from said valve means to the outside of the reservoir whereby said valve means may be manually manipulated to place said conduit in communication with said reservoir through said bottom aperture.

2. A fuel reserve device as defined in claim 1 wherein said legs are parallel and vertical in said reservoir and said valve means comprises a cylindrical sleeve slidable on that leg having the apertures adjacent the bottom of the reservoir.

3. A fuel reserve system as defined in claim 2 wherein said cylindrical sleeve has an axial dimension such that as one end of the sleeve rests on the bottom of the reservoir the body of the sleeve covers the apertures in said one leg of said tubular conduit adjacent the bottom of the reservoir.

4. A fuel reserve system as defined in claim 3 wherein said cylindrical sleeve is fabricated from material having a density heavier than that required for flotation in fuel in said reservoir and said valve operator means comprises an axially-movable rod having one end attached to said sleeve and its other end disposed outside of said reservoir.

5. A fuel system including a fuel reserve device as defined in claim 1 wherein the leg of the U-shaped conduit having the apertures adjacent the bottom of the tank is connected to the fuel pump of an internal combustion engine or the like and the other leg of the conduit is connected to the main fuel supply for said engine or the like.

6. A fuel system as defined in claim 1 wherein said reservoir is disposed behind the rear seat area of a passenger carrying motor vehicle and said valve operator means is accessible to occupants of the interior of said vehicle.

* * * * *